United States Patent
Xue et al.

(10) Patent No.: US 6,944,361 B2
(45) Date of Patent: Sep. 13, 2005

(54) ELECTRICALLY CONTROLLABLE INTEGRATED OPTICAL CROSS-CONNECT

(75) Inventors: Xin Xue, Sunnyvale, CA (US); Haiqing Wei, Sunnyvale, CA (US)

(73) Assignee: Gazillion Bits, Inc., San Jose, CA (US)

( * ) Notice: Subject to any disclaimer, the term of this patent is extended or adjusted under 35 U.S.C. 154(b) by 452 days.

(21) Appl. No.: 10/121,846

(22) Filed: Apr. 12, 2002

(65) Prior Publication Data

US 2002/0181855 A1 Dec. 5, 2002

Related U.S. Application Data

(60) Provisional application No. 60/283,568, filed on Apr. 13, 2001.

(51) Int. Cl.[7] .............................. G02B 6/26; G02B 6/42
(52) U.S. Cl. ............................. 385/16; 385/25; 385/17; 385/19; 385/39
(58) Field of Search ............................. 385/16, 17, 25, 385/30, 39

(56) References Cited

U.S. PATENT DOCUMENTS

| | | | |
|---|---|---|---|
| 3,716,804 A | | 2/1973 | Groschwitz |
| 4,013,000 A | * | 3/1977 | Kogelnik ................... 385/17 |
| 4,471,474 A | | 9/1984 | Fields |
| 4,737,003 A | | 4/1988 | Matsumura et al. |
| 4,773,721 A | | 9/1988 | Erman et al. |
| 4,974,923 A | | 12/1990 | Colak et al. |
| 5,091,983 A | | 2/1992 | Lukosz |
| 5,299,054 A | | 3/1994 | Geiger |
| 5,506,919 A | | 4/1996 | Roberts |
| 5,548,668 A | | 8/1996 | Schaffner |
| 5,581,643 A | * | 12/1996 | Wu ............................. 385/17 |
| 5,796,884 A | | 8/1998 | Wingo |
| 5,905,573 A | | 5/1999 | Stallard et al. |
| 5,960,131 A | | 9/1999 | Fouquet et al. |
| 6,049,641 A | | 4/2000 | Deacon et al. |
| 6,058,228 A | | 5/2000 | Fasanella et al. |
| 6,061,482 A | | 5/2000 | Davis |
| 6,091,867 A | | 7/2000 | Young et al. |
| 6,198,856 B1 | | 3/2001 | Schroeder et al. |
| 6,208,778 B1 | | 3/2001 | Donald |
| 2003/0108274 A1 | * | 6/2003 | Haronian .................... 385/17 |

OTHER PUBLICATIONS

Carts–Powell, Y., "MEMS Cantilever Controls a Guided–Wave Optical Switch," WDM Solutions (Jan. 2001), p. 9.
Chen, J. et al., "Optical Filters from Photonic Band Gap Air Bridges," J. Lightwave Tech., vol. 14, No. 11 (Nov. 1996), pp. 2575–2580.
Duvall, C., "VCSELs May Make Metro Networks Dynamic," WDM Solutions (Nov. 2000), pp. 35–38.

(Continued)

Primary Examiner—John D. Lee
Assistant Examiner—Jemes D. Stein
(74) Attorney, Agent, or Firm—Cooper & Dunham LLP

(57) ABSTRACT

An integrated optical cross-connect device and associated methods are described, the cross-connect device comprising a plurality M of input waveguides formed in a first material layer of an integrated circuit, a plurality N of output waveguides formed in a second material layer of the integrated circuit, and a plurality MN of micromechanically actuated bridge elements formed in at least one intermediate layer lying between the first and second material layers. Responsive to an electrical control signal, each bridge element establishes an index-guided, nonreflecting optical path between its associated input waveguide and its associated output waveguide. Preferably, the bridge element comprises an arcuate waveguide structure substantially surrounded by air or other nonsolid material, the arcuate waveguide structure being twistably connected to a remainder of the intermediate layer by a narrow neck portion. When electrostatically actuated, one end of the arcuate waveguide structure rises to meet the input waveguide while the other end lowers to meet the output waveguide. Associated fabrication methods and an expandable, modular cross-connect system based on the cross-connect device are also described.

27 Claims, 16 Drawing Sheets

OTHER PUBLICATIONS

Hammadi, S. et al., "Air–Bridged Gate MESFET; A New Structure to Reduce Wave Propagation Effects in High–Frequency Transistors," IEEE Transactions on Microwave Theory and Techniques, vol. 47, No. 6 (Jun. 1999), pp. 890–899.

Oh, K, et al., "A New Flip–Chip Bonding Technique Using Micromachined Conductive Polymer Bumps," IEEE Transactions on Advanced Packaging, vol. 22, No. 4 (Nov. 1999), pp. 586–591.

Lau, K. Y., "MEM's the Word for Optical Beam Manipulation: Building Microelectromechanical–Based Optic Systems on a Silicon Chip," Circuits & Devices (Jul. 1997), pp. 11–18.

Lee, S. et al., "Free–Space Fiber–Optic Switches Based on MEMS Vertical Torsion Mirrors," J. Lightwave Tech., vol. 17, No. 1 (Jan. 1999), pp. 7–13.

Madsen, C. et al., "A Tunable Dispersion Compensating MEMS All–Pass Filter," IEEE Photonics Technology Letters, vol. 12, No. 6 (Jun. 2000), pp. 651–653.

Muller, R. et al., "Surface–Micromachined Microoptical Elements and Systems," Proceedings of the IEEE, vol. 86, No. 8 (Aug. 1998), pp. 1705–1720.

Neukermans, A. et al., "MEMS Technology for Optical Networking Applications," IEEE Communications Magazine (Jan. 2001), pp. 62–69.

Ohta, A. et al., "A 12–ps–Resolution Digital Variable–Delay Macro Cell on GaAs 100 K–Gates Gate Array Using a Meshed Air Bridge Structure," IEEE Journal of Solid–State Circuits, vol. 34, No. 1 (Jan. 1999), pp. 33–41.

Quevy, E. et al., "Realization and Actuation of Continuous–Membrane By an Array of 3D Self–Assembling Micro–Mirros For Adaptive Optics," proceedings of the 14th IEEE International Conference on Micro Electro Mechanical Systems (2001), pp. 329–332.

Storment, C. et al., "Flexible, Dry–Released Process for Aluminum Electrostatic Actuators," J. Microelectromechanical Systems, vol. 3, No. 3 (Sep. 1994), pp. 90–96.

Toshiyoshi, H. et al., "Design and Analysis of Micromechanical Tunable Interferometers for WDM Free–Space Optical Interconnection," J. Lightwave Tech., vol. 17, No. 1 (Jan. 1999), pp. 19–25.

* cited by examiner cross-section K-K' (see FIG. 2)

ELECTRICALLY CONTROLLABLE INTEGRATED OPTICAL CROSS-CONNECT

CROSS-REFERENCE TO RELATED APPLICATIONS

This application claims the benefit of Provisional Application Ser. No 60/283,568, filed Apr. 13, 2001, which is incorporated by reference herein.

FIELD

This patent specification relates to optical devices. More particularly, it relates to optical cross-connect devices for use in optical networks or in other applications.

BACKGROUND

Optical cross-connect switches may be used in a variety of practical applications including optical communication applications. For example, in a fiber optic communications network in which each fiber optic cable carries a plurality of wavelength-division multiplexed (WDM) channels, it may be desirable to switch traffic from a source fiber to any one of a plurality of destination fibers, without requiring the demultiplexing or electrical-to-optical conversion of the optical channels. Such fiber-based switching may be desirable, for example, to allow traffic switching around cable cuts, to better balance communications traffic among communications centers, or for a variety of other purposes in either long-haul or short-haul networks. It would be desirable to provide an optical cross-connect device capable of directing an optical signal from any of "M" input optical waveguides to any of "N" optical output waveguides, responsive to electrical control signals. It would be further desirable to provide such an optical cross-connect device in which M and N may be relatively large, while the overall device size remains relatively modest. It would be still further desirable to provide an optical cross-connect device that is readily amenable to known semiconductor manufacturing methods, for allowing both smaller size and lower per-unit costs. It would be even further desirable to provide an optical cross-connect device that is readily amenable to a single-growth fabrication process that avoids the need for multiple growth and wafer bonding steps, thereby further increasing fabrication yields and reducing costs. It would be still further desirable to provide an optical cross-connect device that is amenable to inclusion in a modular, expandable optical cross-connect system.

SUMMARY

An integrated optical cross-connect device is provided, comprising a plurality M of input waveguides formed in a first material layer of an integrated circuit, a plurality N of output waveguides formed in a second material layer of the integrated circuit, and a plurality MN of micromechanically actuated bridge elements formed in at least one intermediate material layer lying between the first and second material layers. Responsive to an electrical control signal, each bridge element establishes an index-guided, nonreflecting optical path between its associated input waveguide and its associated output waveguide when in an ON position. In an OFF position, the bridge waveguide optically isolates that input waveguide from that output waveguide.

In one preferred embodiment, each input waveguide passes near each output waveguide at a common vertical axis, the input and output waveguides forming a first angle with respect to each other. A light beam traveling along the input waveguide is bent by an amount corresponding to that first angle when it is transferred over to the output waveguide by the bridge waveguide. Preferably, the first angle is less than 60 degrees to reduce bending losses, and the bridge waveguide has an arcuate shape having a radius of curvature greater than a bending loss threshold at all locations therealong. In one preferred embodiment, in the ON position, the bridge waveguide makes mechanical contact with the input and output waveguides to establish the optical path therebetween. In another preferred embodiment, in the ON position, the bridge waveguide does not establish mechanical contact with the input and output waveguides, but is positioned close enough thereto to establish resonant couplings therewith to establish the optical path.

Preferably, the bridge waveguide is substantially surrounded by air gaps or other non-solid material such that vertical motion of its ends is permitted. The bridge element is connected to a remainder of the intermediate layer by a twistable neck portion. The neck portion twists when one end of the bridge waveguide rises to meet the input waveguide while the other end lowers to meet the output waveguide. In one preferred embodiment, he bridge element comprises an electrostatically active material and is actuated by electrostatic forces. In other preferred embodiments, the bridge element is piezoelectrically, magnetostrictively, or photorestrictively actuated. The bridge element, which is suspended in a subsurface air gap, is fabricated by constructing the requisite device patterns in an entirely solid multi-layer format, with a uniquely etchable material being disposed in all areas in which there is going to be an air gap. The other material used to form the waveguides and the bridge element, as well as a bridge element base, are selected to be etch-resistant to the etchant of the uniquely etchable material. During subsequent device fabrication steps, the uniquely etchable material is etched away, leaving the requisite structure including the suspended bridge element.

In other preferred embodiments, an expandable, modular optical cross-connect system is provided comprising a backplane for holding a j×k array of the M×N cross-connect modules and providing optical and electrical signals thereto. The input and output waveguides of each cross-connect module run across its entire length and width, respectively, to precisely flattened side edges thereof. When two such cross-connect modules are positioned next to each other in the lengthwise direction, light beams exit the input waveguides of one module and proceed across a very narrow gap directly into corresponding input waveguides of the next module with tolerable losses. Similar optical connectivity is achieved among modules positioned next to each other in the widthwise direction, and therefore an aM×bN cross-connect device can be formed by inserting ab modules on the backplane, $1 \leq a \leq j$, $1 \leq b \leq k$.

DETAILED DESCRIPTION

Figure 1:
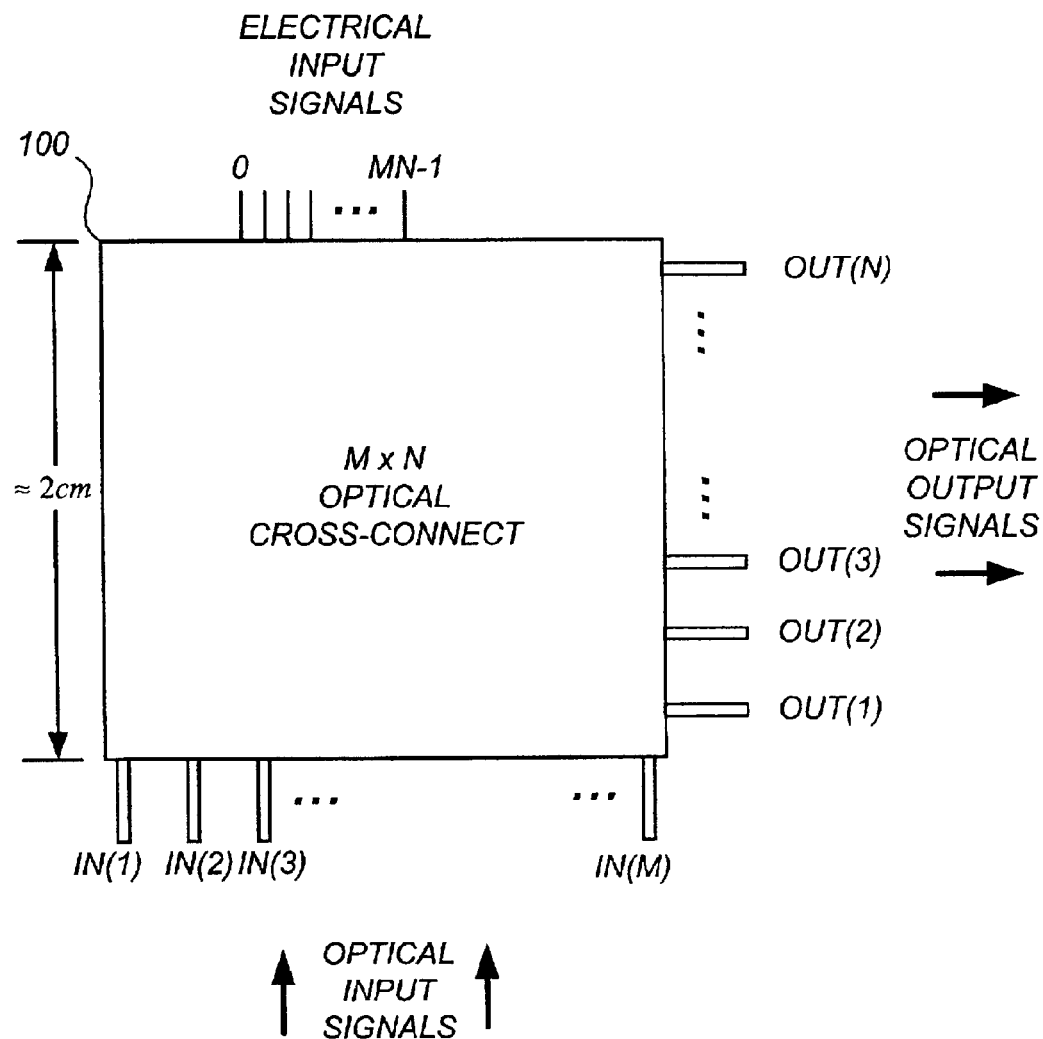
FIG. 1 illustrates an exterior view of an optical cross-connect device in accordance with a preferred embodiment.

FIG. 1 illustrates an electrically controllable integrated optical cross-connect device 100 in accordance with a preferred embodiment. The objective of the cross-connect device 100 is to selectively and dynamically connect any of a first plurality of planar optical waveguide inputs IN(1), IN(2), . . . , IN(M) to any of a second plurality of planar optical waveguide outputs OUT(1), OUT(2), . . . , OUT(N) responsive to electrical control signals. Because the design is readily amenable to construction using known semiconductor fabrication methods, the size M×N of the cross-connect device may grow very large, e.g., up to 100×100. At the same time, however, the overall size of the cross-connect device 100 remains relatively modest, e.g., 2 cm×2 cm, making it useful for a variety of practical applications. The electrical signals are shown as entering the cross-connect device 100 through pins on its side. In an alternative preferred embodiment described further infra, these electrical signals may enter through surface-mounted metallic connections on the top and/or bottom of the cross-connect device 100.

Figure 2:
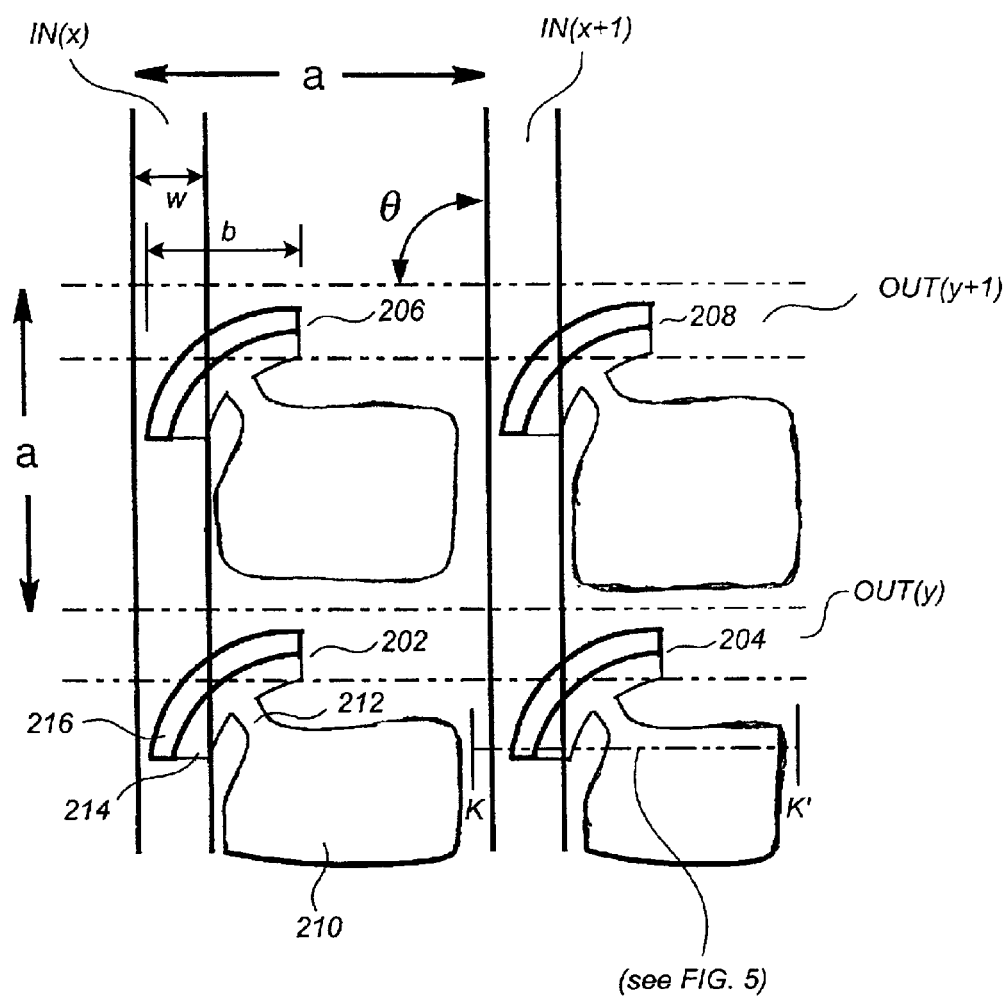
FIG. 2 illustrates a top cut-away view of a portion of an optical cross-connect device in accordance with a preferred embodiment.

FIG. 2 illustrates a top view of a portion of the layout of the cross-connect device 100, in particular showing four (4) waveguide bridging elements 202, 204, 206, and 208 at the respective intersections of two input waveguides IN(x) and IN(x+1) with two output waveguides OUT(y) and OUT(y+1). The remainder of this disclosure focuses on a single waveguide bridging element 202, it being understood that there are (MN−1) other waveguide bridging elements that are substantially similar to the waveguide bridging element 202. The waveguide bridging element 202 represents one type of bridging waveguide element that is separate from the input and output waveguides themselves, and that is used to bridge the input and output waveguides responsive to electrical control signals.

According to a preferred embodiment, the waveguide bridging element 202 is a movable waveguide element designed and configured such that it couples light from the input waveguide IN(x) into the output waveguide OUT(y) when in an "ON" state. When switched into the "ON" state, the waveguide bridging element 202 physically moves into a position such it provides an optical pathway connecting the waveguides. When in an "OFF" state, the waveguide bridging element 202 physically moves to an "OFF" position such that the optical circuit between the input waveguide IN(x) into the output waveguide OUT(y) is cut off. The movement of the waveguide bridging element 202 between the "ON" and "OFF" positions is actuated by the electrical control signals provided to the optical cross-connect device 100 shown in FIG. 1. While the embodiments described infra relate to an electrostatically actuated movement, it is to be understood that the scope of the preferred embodiments is not so limited, and that actuation may be provided using piezoelectric, magnetostrictive, photorestrictive, or other microelectromechanical (MEMS) actuation techniques in accordance with the preferred embodiments.

For clarity of description, the remainder of the present disclosure presents the input waveguide IN(x) as being in a "bottom" layer (although shown as solid lines in FIG. 2), the output waveguide OUT(x) as being in a "top" layer (although shown as dotted lines in FIG. 2), and the waveguide bridging element 202 as being in a "middle" layer. An upper spacer layer is placed between the top and middle layers, and a lower spacer layer is placed between the middle and bottom layers. With reference to FIG. 2, the input and output waveguides IN(x) and OUT(y) are shown at an angle θ with respect to each other around a common vertical axis, this angle being close to 90 degrees. However, it has been found that use of a higher angle, e.g. at 120 degrees or above, provides for better light coupling between the input and output waveguide arrays. In the case of θ=120 degrees, for example, the coupling is superior to the case of θ=90 degrees because the light does not need to change direction by the full 90 degrees, but rather only needs to change direction by 60 degrees, thereby reducing bending losses in the waveguide bridging element 202.

Waveguide bridging element 202 comprises a thin (e.g., 10–20 μm) layer of material shaped to form an anchor portion 210, a neck portion 212, an electrostatically active portion 214, and an arc connector portion 216. It is to be appreciated that the waveguide bridging element 202, while presented infra as a single layer, may actually comprise multiple layers over its entire area, or over selected portions of its area, to achieve the described functionalities. Importantly, however, the selected materials must have common etching characteristics with respect to a common set of etchants to allow the device to be properly fabricated using the methods described infra. The material used for waveguide bridging element 202 in its arc connector portion 216 should be a dielectric material having refractive index that is appreciably large as compared to the immediately surrounding void regions. This allows for incoming light to be turned by the angle (180−θ) from the input waveguide IN(x) to the output waveguide OUT(y). Examples of such materials may include quartz (crystalline $SiO_2$) or polycrystalline silicon.

The material for the electrostatically active portion 214 requires at least a portion of its thickness to comprise a conducting material such as a metal or a doped semiconductor. This allows the electrostatically active portion 214 to experience an induced charge responsive to the presence of a voltage differential between two external plates (described further infra), resulting in a torque around the neck portion 212. The electrostatically active element 214 shares an elongated border with the arc connector portion 216, as illustrated in FIG. 2, such that these two elements will move together.

In an alternative preferred embodiment, the electrostatically active element 214 is completely integrated with the arc connector portion 216 from a lateral perspective, i.e., the electrostatically active element 214 simply lies along a top or bottom surface of the arc connector portion 216. In this alternative preferred embodiment, there will be some optical losses due to the presence of a conducting material along a surface of a waveguide. It has been found, however, that a highly conductive material is not necessarily required to achieve the needed electrostatic activity. Instead, only a partially conducting material can be used, such as a more lightly doped semiconductor, for cutting down on the optical losses. Indeed, it has been found that even an end-to-end resistance of 1 megohm for the electrostatically active element 214 provides sufficient electrostatic properties to achieve the required torque around the neck portion 212. In another alternative preferred embodiment, electrostatically active element 214 and the arc connector portion 216 can actually be the same physical body, e.g., a doped semiconductor. For simplicity and clarity of explanation, the alternative embodiment in which the electrostatically active element 214 lies along a top surface of the arc connector portion 216 is presented herein.

The electrostatically active element 214 is hingeably connected to the anchor portion 210 via the neck portion 212, such that the arc connector portion 216 will twist about an axis of rotation, the axis of rotation being parallel to the planes of the input and output waveguides, the axis of rotation being oriented at an angle that bisects the angle θ formed between the IN(x) and OUT(y) waveguides. Neck portion 212 and anchor portion 210 comprise a material that is solid, but that is flexible enough to allow the neck portion 212 to rotate by a very small angle responsive to a torque applied to the arc connector portion 216. Although any of a variety of materials may satisfy this requirement, quartz or polycrystalline silicon are two exemplary candidates for these elements. Quartz or single-crystal silicon may be particularly advantageous because, due to their crystalline structure, it is robust against material fatigue that may occur near the neck portion. In many cases, all of the portions of the waveguide bridging element 202 may share a common layer of material such as quartz or crystalline silicon.

By way of nonlimiting example, typical lateral dimensions of the optical interconnect device of FIG. 2 may include a waveguide spacing "a" of about 0.1 mm to 1 mm, and a waveguide width "w" of about 1–10 μm. Another typical lateral dimension may include a dimension "b" of the arc connector portion 216 of about 0.1 mm to 0.5 mm.

Figure 3:
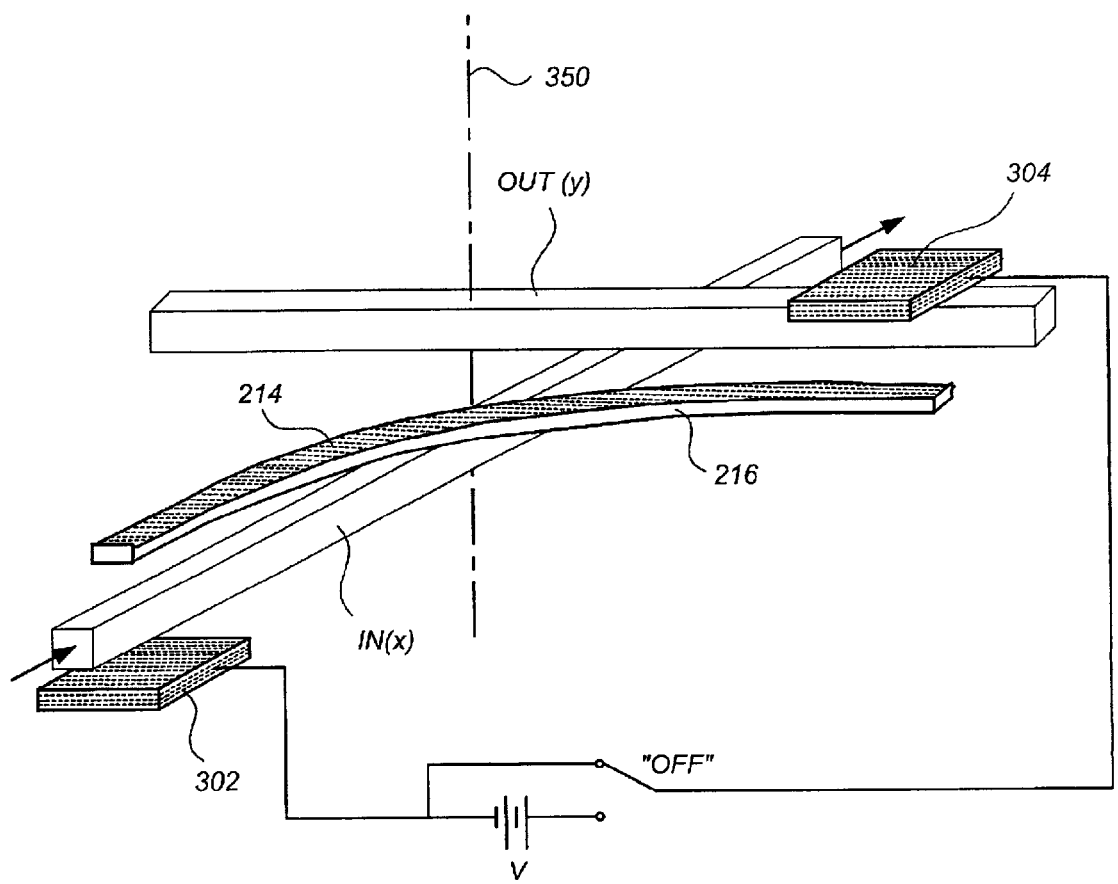
FIG. 3 illustrates a simplified perspective view of a waveguide bridging portion of the optical cross-connect device of FIG. 2 in an "OFF" state.

FIG. 3 illustrates a simplified perspective view of the arc connector portion 216 of the waveguide bridging element 202 in an "OFF" state. As indicated in FIG. 3, the input waveguide IN(x) is placed in a first plane, while the output waveguide OUT(y) is placed in a second plane distinct from, but parallel to, the first plane. The input waveguide IN(x) passes under the output waveguide OUT(y) at the common vertical axis 350. The waveguide bridging element 202 containing the arc connector portion 216 is positioned in a third plane lying between the first and second planes. In the embodiment of FIG. 3, the arc connector portion 216 comprises the electrostatically active element 214 on its surface. As indicated in FIG. 3, the arc connector portion 216 contains as shallow a bending radius as is practicable to avoid bending losses, preferably having a bending radius therealong not less than a minimum threshold bending radius. For clarity of disclosure, the substrates into which the waveguides IN(x) and OUT(y) are formed are not shown in FIG. 3. Also for clarity of disclosure, none of the neck portion 212, the anchor portion 210, or spacer layers is shown in FIG. 3.

Figure 4:
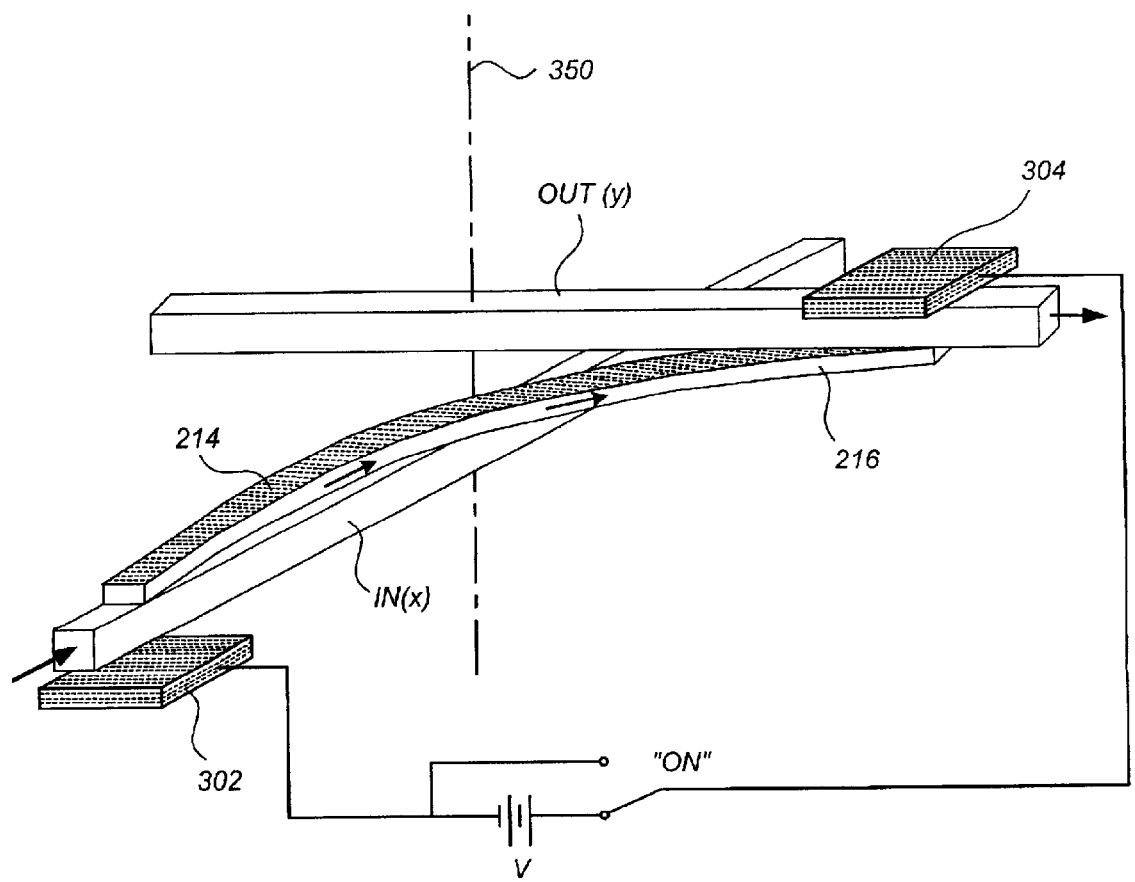
FIG. 4 illustrates a simplified perspective view of a waveguide bridging portion of he optical cross-connect device of FIG. 2 in an "ON" state.

Plates 302 and 304 are positioned as shown in FIG. 3 and are switchably connected to a voltage source V. The plates 302 and 304 are usually integrated into the same substrates as the waveguides IN(x) and OUT(y), and may be either metallic or may comprise a heavily doped semiconductor material. Where no voltage exists between the plates 302 and 304, the waveguide bridging element is in an "OFF" state. As indicated FIG. 4 illustrates a simplified perspective view of the arc connector portion 216 of the waveguide bridging element 202 in an "ON" state. Where a sufficient voltage V exists between the plates 302 and 304, there is an (a) induced charge distribution along the electrostatically active element 214, (b) an electrostatic attraction between the respective ends of the arc connector portion 216 and the plates 302 and 304, (c) a resulting torque at the neck portion 212, and (d) a resulting movement of the arc connector portion 216 into the position shown in FIG. 4. As illustrated in FIG. 4, the arc connector portion 216 now touches each of the waveguides IN(x) and OUT(y). It has been found that this touching is sufficient to establish an optical circuit between the two, with acceptably low signal loss.

In another preferred embodiment, the arc connector portion 216 is positioned close to, but not touching, the waveguides IN(x) and OUT(y) in the "ON" state. In particular, the waveguide bridging element 202 is dimensioned and positioned such that, when in the "ON" state, the two ends of the arc connector portion 216 form resonant couplings with the waveguides IN(x) and OUT(y), respectively. Precise dimensions, waveguide elasticity characteristics, and electrostatic force characteristics are required in order to establish proper spacing to achieve the resonant coupling. For this reason, the preferred embodiment in which the arc connector portion 216 makes actual contact with the waveguides is generally easier to manufacture and implement. Nevertheless, the preferred embodiment in which resonant coupling is achieved may be useful in achieving variable coupling efficiency, so as to allow dynamic control of the output optical signal strength. This may be useful, for example, in achieving a one-to-many "broadcast" capability described further infra.

In another preferred embodiment, electrostatic force on the arc connector portion 216 may be achieved even without the existence of electrostatically active portion 214 and even if arc connector portion 216 is purely dielectric. This is possible if a tip electrode or a linear electrode is configured (e.g., by making it a pointed electrode or a narrow-banded electrode) to create a non-uniform electric field along at least a portion of the dielectric arc connector portion 216. The electrostatic force will arise from induced electric dipoles in the dielectric arc connector portion 216. The induced dipoles will experience a nonzero force due to the non-uniform electric field. In this embodiment, however, the strength of the neck portion 212 would need to be substantially weaker as compared to the two-plate embodiment, because the induced torque will be substantially lower.

Figure 5:
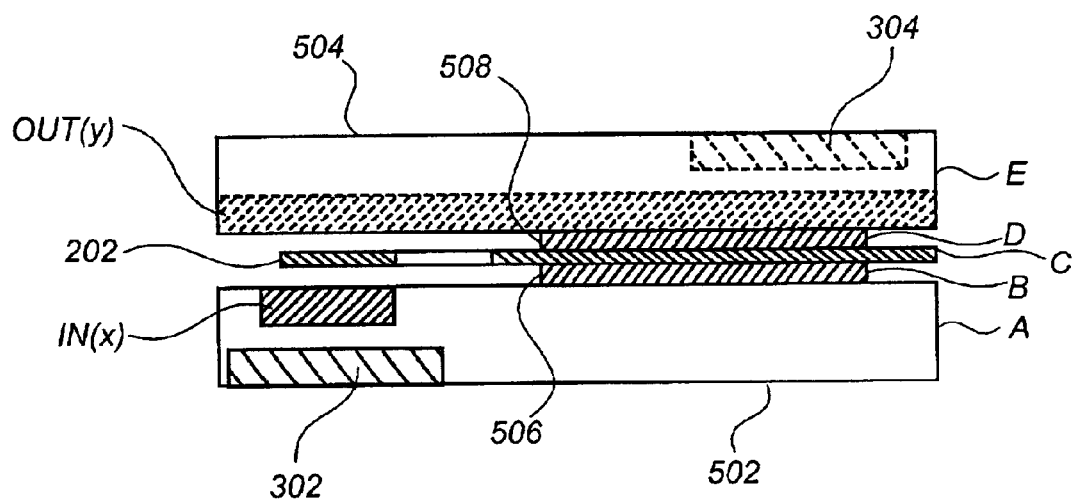
FIG. 5 illustrates a simplified side cross-section of a portion of the optical cross-connect device of FIG. 2.

FIG. 5 illustrates a conceptual side cut-away view of the optical cross-connect device 100 taken along a slice K-K' illustrated in FIG. 2. Formed in a lower substrate 502 is both the input waveguide IN(x) and the bottom electrode plate 302. Between the waveguide bridging element 202 and the lower substrate 502 is a lower spacer layer 506. Formed in an upper substrate 504 is both the output waveguide OUT(y) and the top electrode plate 304, these elements being illustrated in dotted lines because, as shown in FIG. 2, they lie outside of the plane K-K', these elements being included in FIG. 5 for completeness and clarity of description. Between the waveguide bridging element 202 and the upper substrate 504 is an upper spacer layer 508.

By way of example and not by way of limitation, exemplary dimensions for the cross-connect device as illustrated in FIG. 5 may include: a thickness for lower substrate layer 502 in the range of about 1 mm; a thickness for lower spacer layer 506 in the range of about 10 μm; a thickness for waveguide bridge element 202 in the range of about 10–20 μm; a thickness for upper spacer layer 508 in the range of about 10 μm; and a thickness for upper substrate layer 504 in the range of about 1 mm. However, these dimensions may vary significantly depending on the type of material used.

For purposes of describing fabrication methods of an integrated cross-connect device in accordance with a preferred embodiment, FIG. 5 illustrates the lower substrate 502 as layer "A", the lower spacer 506 as layer "B," the waveguide bridging element 202 as layer "C", the upper spacer 508 as layer "D", and the upper substrate 504 as layer "E". It is to be appreciated that the each of these elements 502, 506, 202, 508, and 504 may comprise multiple sub-layers or lateral sub-patterns of material (e.g., the lower substrate layer 502 has waveguides and electrical plates formed within it). However, for purposes of the device fabrication steps described infra, it is simply required that any components of a given layer material A, B, C, D, or E have common etching characteristics with respect to a common set of etchants. Also, it is required that some of the layer materials be responsive to particular etchants to which other layer materials are not responsive. A person skilled in the art would be readily able, without undue experimentation, to determine proper sets of layer compositions and chemical etchants to achieve the functionalities described herein.

FIGS. 6–11 illustrate steps for fabricating a cross-connect device in accordance with a preferred embodiment in which a wafer bonding step is used. FIGS. 12–15 illustrate steps for fabricating a cross-connect device in accordance with an alternative preferred embodiment in which only a single-growth process is used.

Figure 6:
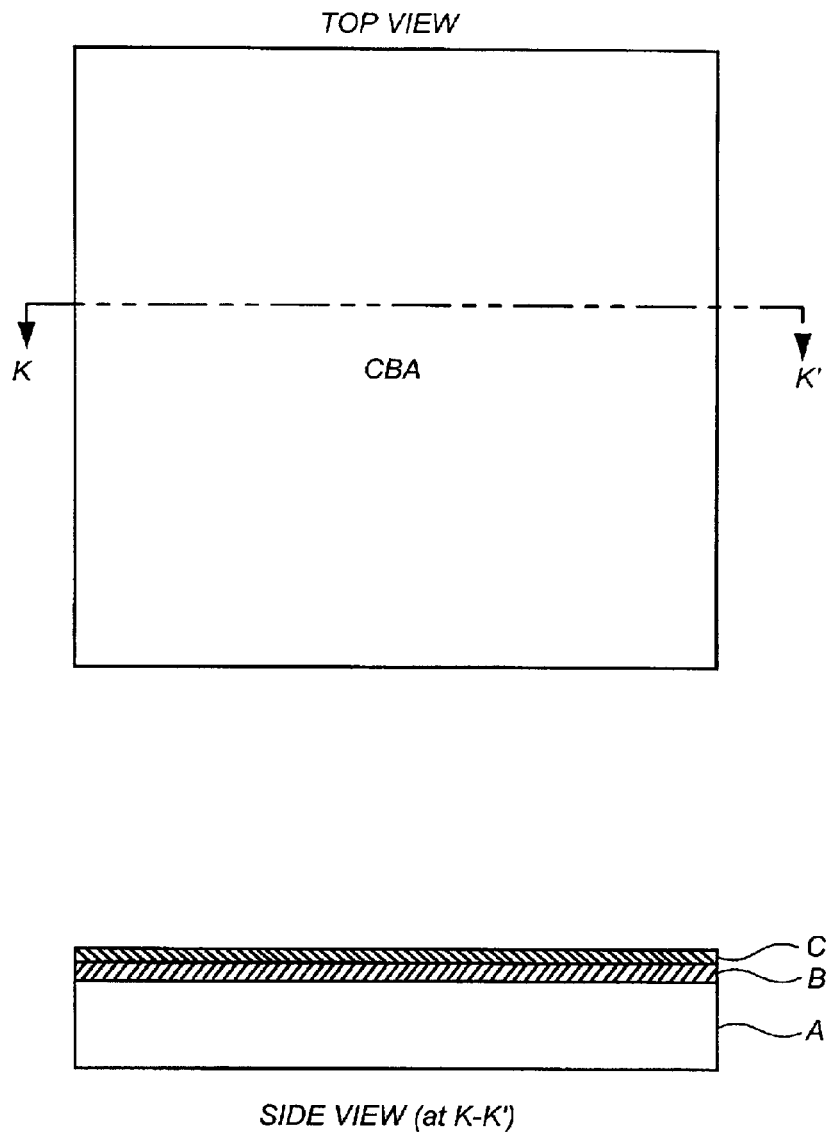
FIGS. 6–9 illustrate steps for fabricating two lower layers and a waveguide bridging layer in accordance with a preferred embodiment.

FIG. 6 illustrates the results of a first step of fabricating a cross-connect device according to the preferred embodiment in which a wafer bonding step is used. In particular, a top view and side view corresponding to a region of interest, or cell, near the location of the K-K' cross-section of FIG. 2 is illustrated. A simple three-layer structure is formed having no patterns or cross-sections therein, comprising simply the layer "C" as the top layer, the layer "B" as the middle layer, and the layer "A" as the bottom layer. In FIG. 6, this is denoted by the string "CBA" across the entire cell.

Figure 7:
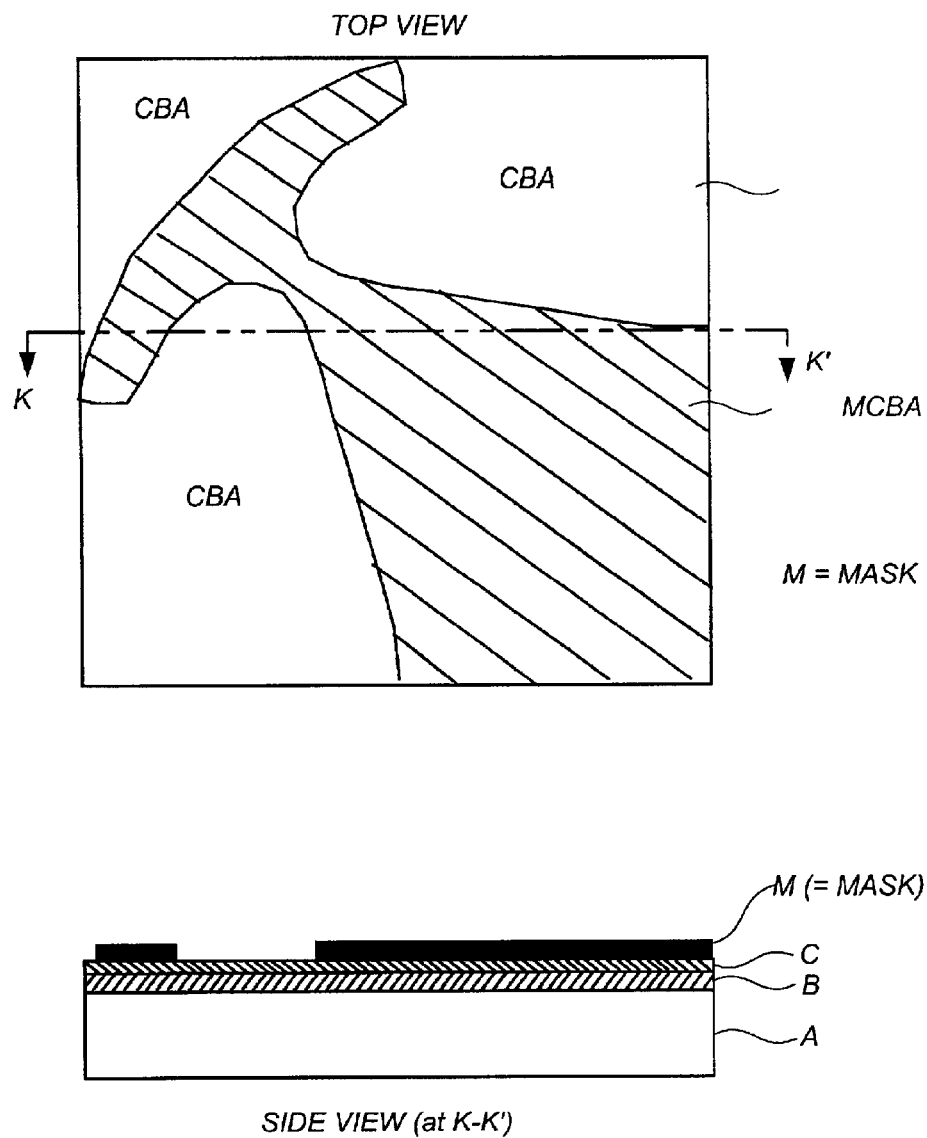

FIG. 7 illustrates the formation of a mask layer "M" over a selected portion of the cell that defines the outline of the waveguide bridging element. The masked region is denoted "MCBA" in the top view of FIG. 7. The non-masked area just has the notation "CBA." As indicated in the cross-section view of FIG. 7, the mask "M" only covers a portion of the device along the line K-K'.

Figure 8:
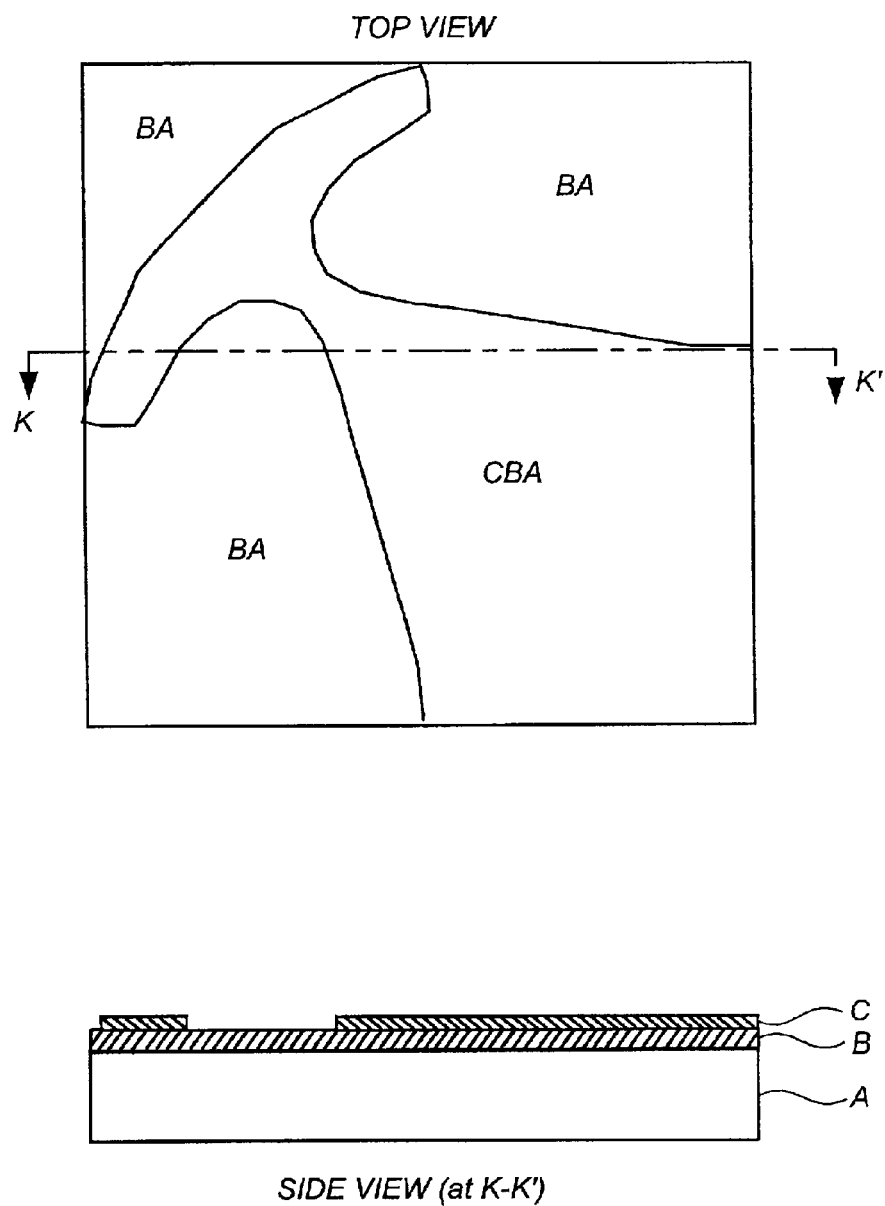

Following the mask application, the device is etched with an etchant to which the C material, but not the B material, is responsive. This etching step is preferably anisotropic so that the lateral shape of the waveguide bridging element is maintained at layer C. The result is illustrated in FIG. 8.

Figure 9:
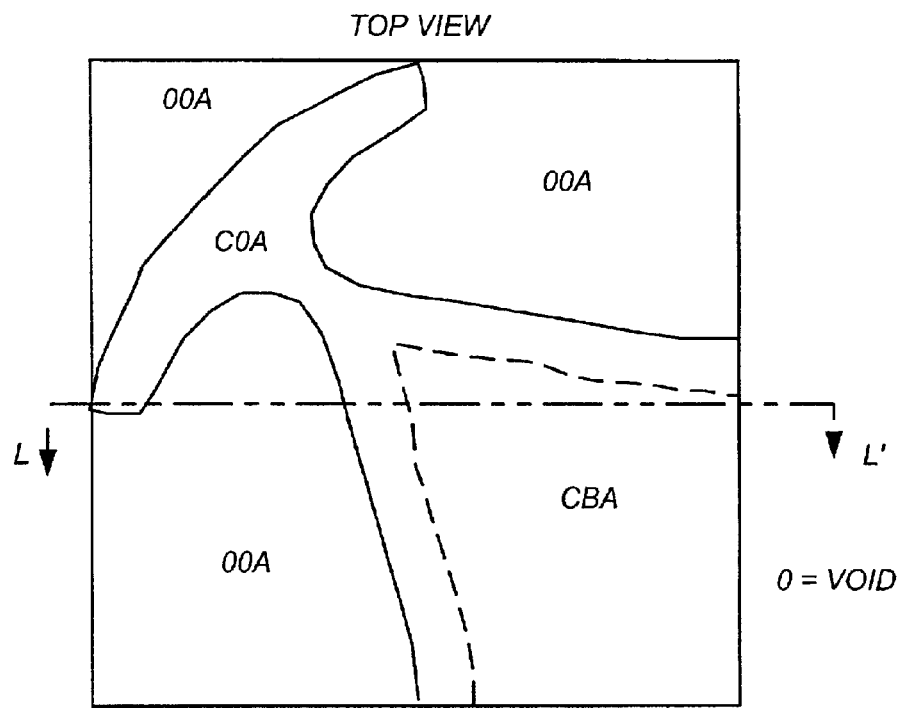
Figure 9:
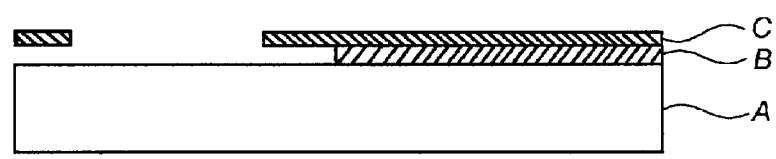

Next, an isotropic etching step is applied, using an etchant that etches material B but does not etch material C or material A. The result is illustrated in FIG. 9. As indicated in FIG. 9, the elongated nature of the arc connector portion and neck of the waveguide bridging element allows all of the B material under these sections to be etched away, leaving only an air void in its place. Notationally, the presence of a void in place of etched-away material is shown as a "0." Thus, the string "C0A" over the arc connector portion indicates there is the C material at the top layer, air/void in the middle layer, and A material in the bottom layer.

Figure 10:
FIGS. 10–11 illustrate steps for fabricating two upper layers and wafer bonding the resulting structure to the structure of FIG. 9 to form an optical cross-connect device in accordance with a preferred embodiment.
Figure 11:
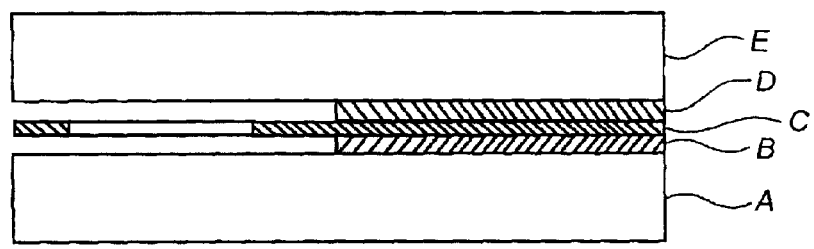

FIG. 10 illustrates the result of a standard formation of the D and E layers. The D-E structure of FIG. 10 is formed on a separate wafer than the A-B-C structure of FIG. 9. The two wafers are then bonded together using wafer bonding techniques known in the art, the resulting completed structure being illustrated in FIG. 11.

Figure 12:
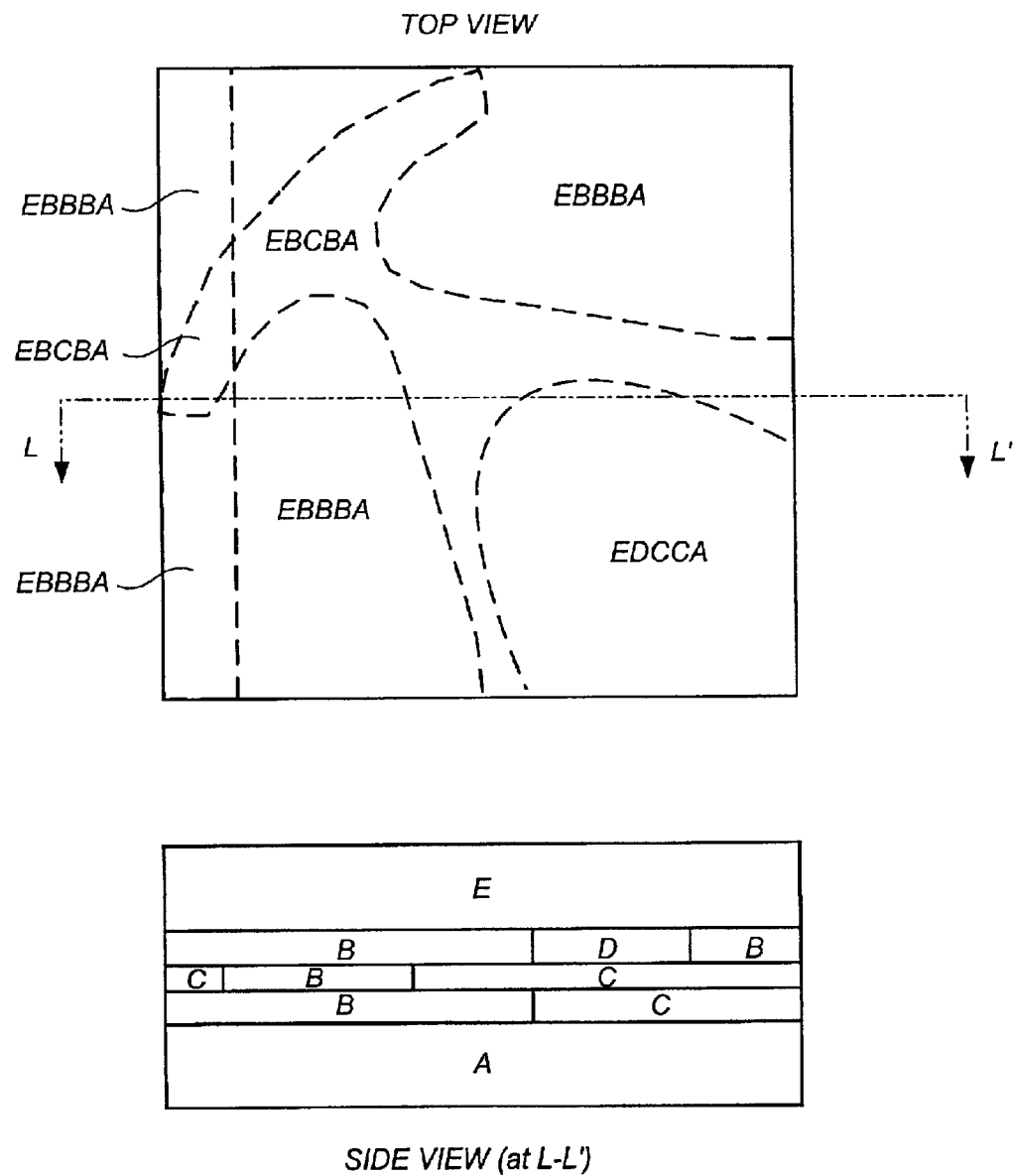
FIGS. 12–15 illustrate steps for fabricating an optical cross-connect device in a ingle-growth process in accordance with a preferred embodiment.

FIG. 12 illustrates the results of a first step for fabricating a cross-connect device according to the alternative preferred embodiment in which only a single-growth process is used and wafer bonding is avoided. In particular, a solid wafer is formed comprising all of the required materials already deposited in the proper place, except that material B is placed where air gaps are supposed to be. In this embodiment, the lower spacer layer (the second layer from the bottom) of the end result will comprise layer C material instead of layer B material.

Figure 13:
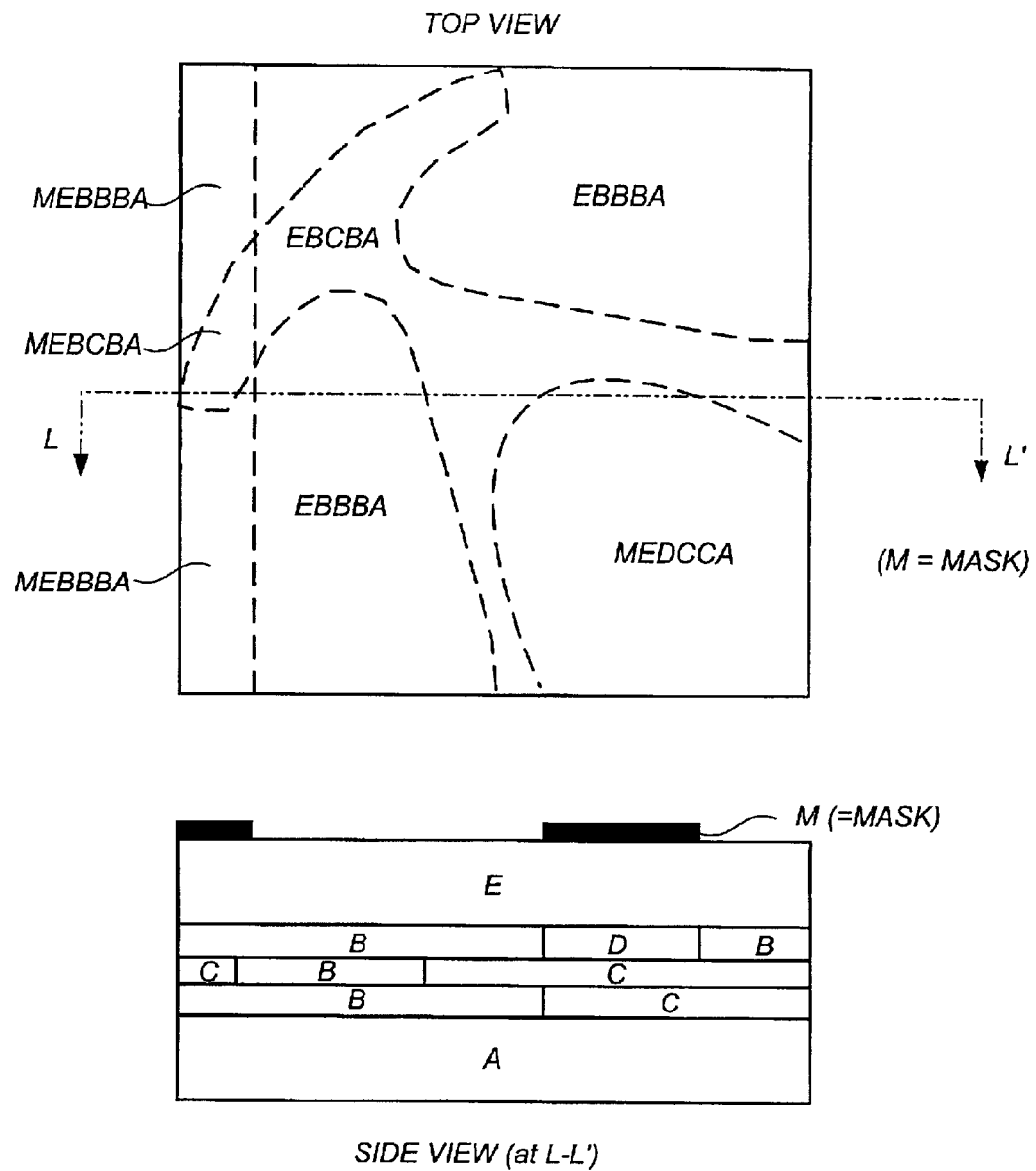

FIG. 13 illustrates the results of a second step in which a mask covering particular portions of the device is applied. In particular, a spacer area (MEDCCA) is masked along with the area of the upper waveguide element as it exists on the E layer (MEBBBA, MEBCBA, MEBBBA). Following the mask application, the device is etched with an etchant to which E material, but not B material, is responsive. This etching step is preferably anisotropic so that the lateral shape of the waveguide is maintained at layer E. The result is illustrated in FIG. 14.

Figure 14:
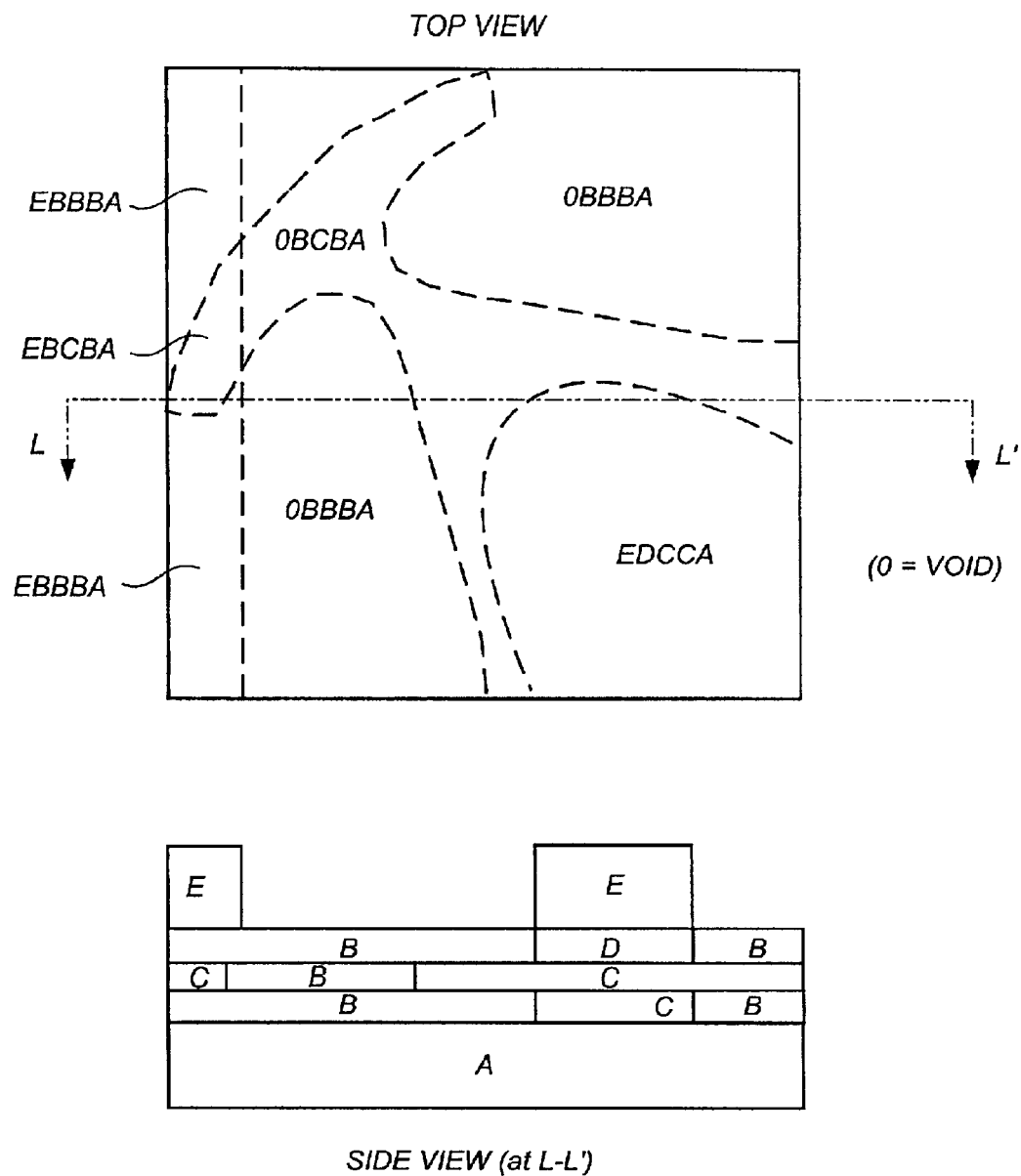
Figure 15:
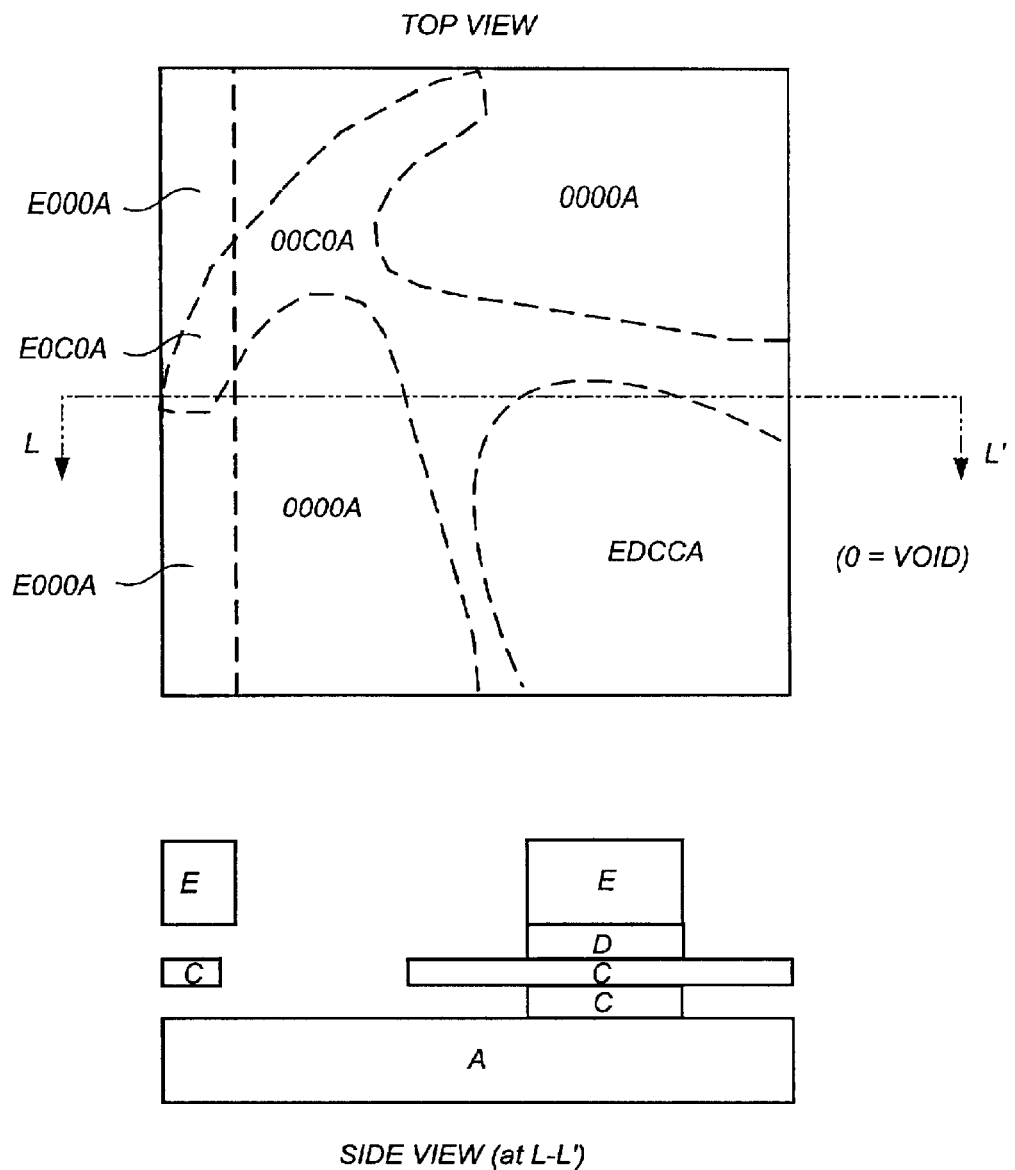

Finally, the device of FIG. 14 is etched with an etchant to which B material, but not A, C, D, or E material, is responsive. This etching step should be isotropic so that proper undercuts are achieved to form the desired air gaps. The result is illustrated in FIG. 15. It is to be appreciated that the material "E" in the upper left corner of the cross-sectional view of FIG. 15 is not actually suspended in space. Rather, it is integral with the "E" layer of the neighboring cell to the left of the cell illustrated in FIG. 15. In particular, it is integral with the portion of the neighboring cell to the left corresponding to the "EDCCA" portion of the cell illustrated in FIG. 15, and therefore is secured in position. Likewise, the material "C" that appears to be hanging in the cross-sectional view of FIG. 15 is actually integral with the arc connector portion of the cell, so it too is secured in position.

In fabricating a cross-connect device in accordance with the preferred embodiments, one or more of the following references may be of further assistance. Each of the following references is incorporated by reference herein: U.S. Pat. Nos. 5,091,983 (Lukosz); U.S. Pat. No. 4,974,923 (Colak et. al.); U.S. Pat. No. 5,905,573 (Stallard et. al.); U.S. Pat. No. 5,506,919 (Roberts et. al.); U.S. Pat. No. 5,548,668 (Schaffner et. al.); and U.S. Pat. No. 4,471,474 (Fields); (a) Neukermans, A. et. al., "MEMS Technology for Optical Networking Applications," IEEE Communications Magazine (January 2001), pp. 62–69; (b) Lee, S. et. al., "Free-Space Fiber-Optic Switches Based on MEMS Vertical Torsion Mirrors," J. Lightwave Tech., Vol. 17, No. 1 (January 1999), pp. 7–13; (c) Madsen, C. et. al., "A Tunable Dispersion Compensating MEMS All-Pass Filter," IEEE Photonics Technology Letters, Vol. 12, No. 6 (June 2000), pp. 651–653; (d) Quevy, E. et. al., "Realization and Actuation of Continuous-Membrane By an Array of 3D Self-Assembling Micro-Mirrors For Adaptive Optics," Proceedings of the 14th IEEE International Conference on Micro Electro Mechanical Systems (2001), pp. 329–332; (e) Storment, C. et. al., "Flexible, Dry-Released Process for Aluminum Electrostatic Actuators," J. Microelectromechanical Systems, Vol. 3, No. 3 (September 1994), pp. 90–96; (f) Toshiyoshi, H. et. al., "Design and Analysis of Micromechanical Tunable Interferometers for WDM Free-Space Optical Interconnection," J. Lightwave Tech., Vol. 17, No. 1 (January 1999), pp. 19–25; (g) Lau, K.Y., "MEM's the Word for Optical Beam Manipulation: Building Microelectromechanical-Based Optical Systems on a Silicon Chip," Circuits & Devices (July 1997), pp. 11–18; (h) Chen, J. et. al., "Optical Filters from Photonic Band Gap Air Bridges," J. Lightwave Tech., Vol. 14, No. 11 (November 1996), pp. 2575–2580; (i) Muller, R. et. al., "Surface-Micromachined Microoptical Elements and Systems," Proceedings of the IEEE, Vol. 86, No. 8 (August 1998), pp. 1705–1720; (j) Kwang, W. et. al., "A New Flip-Chip Bonding Technique Using Micromachined Conductive Polymer Bumps," IEEE Transactions on Advanced Packaging, Vol. 22, No. 4 (November 1999), pp. 586–591; (k) Hammadi, S. et. al., "Air-Bridged Gate MESFET: A New Structure to Reduce Wave Propagation Effects in High-Frequency Transistors," IEEE Transactions on Microwave Theory and Techniques, Vol. 47, No. 6 (June 1999), pp. 890–899; (1) Ohta, A. et. al., "A 12-ps-Resolution Digital Variable-Delay Macro Cell on GaAs 100 K-Gates Gate Array Using a Meshed Air Bridge Structure," IEEE Journal of Solid-State Circuits," Vol. 34, No. 1 (January 1999), pp. 33–41; (m) Carts-Powell, Y., "MEMS Cantilever Controls a Guided-Wave Optical Switch," WDM Solutions (January 2001), p. 9; and (n) Duvall, C., "VCSELs May Make Metro Networks Dynamic," WDM Solutions (November 2000), pp. 35–38.

Thus, according to one feature of the preferred embodiments, an optical waveguide cross-connect device implemented in integrated circuit form is provided, the cross-connect device comprising a micromechanically-driven element that couples one of a plurality of input waveguides to one of a plurality of output waveguides responsive to an electrical signal.

According to another feature of the preferred embodiments, such a cross-connect device is provided in which distinct bridging waveguide elements, separate from the input and output waveguides themselves, are used to bridge the input and output waveguides together responsive to electrical control signals. In one preferred embodiment, actual contact is made between the bridge waveguide element and the input/output waveguides when in the ON state. In another preferred embodiment, no contact is made but the bridge waveguide is close enough to form resonant couplings with the input/output waveguides when in the ON state.

According to another feature of the preferred embodiments, the input and output waveguides are formed on first and second layers of an integrated circuit structure, while the bridge element is formed in a third layer of the integrated circuit structure lying between the first and second layers.

According to another feature of the preferred embodiments, an angle formed between the input array of waveguides and the output array of waveguides is greater than 90 degrees, for increasing the coupling efficiency. In still another preferred embodiment, this angle exceeds 120 degrees.

According to another feature of the preferred embodiments, the optical cross-connect device 100 is modified into a cross-connect module such that a modular, expandable optical cross-connect system may be established. According to this embodiment, a single backplane may be provided that holds a variable number of optical cross-connect modules, whereby a simple M×N cross-connect system comprising a single cross-connect module may be expanded by adding three identical cross-connect switches to create a 2M×2N cross-connect system. To extend the example, an additional five (5) identical cross-connect modules may subsequently be added to form a 3M×3N cross-connect system, and so on. In this manner, a single architecture and component set may be used to form a wide variety of switch sizes. By way of example and not by way of limitation, the individual cross-connect modules may be 100×100 in size, such that an original system of only 100×100 may later be expanded to form a switch as large as 1000×1000 by the addition of ninety-nine (99) additional modules.

Figure 16:
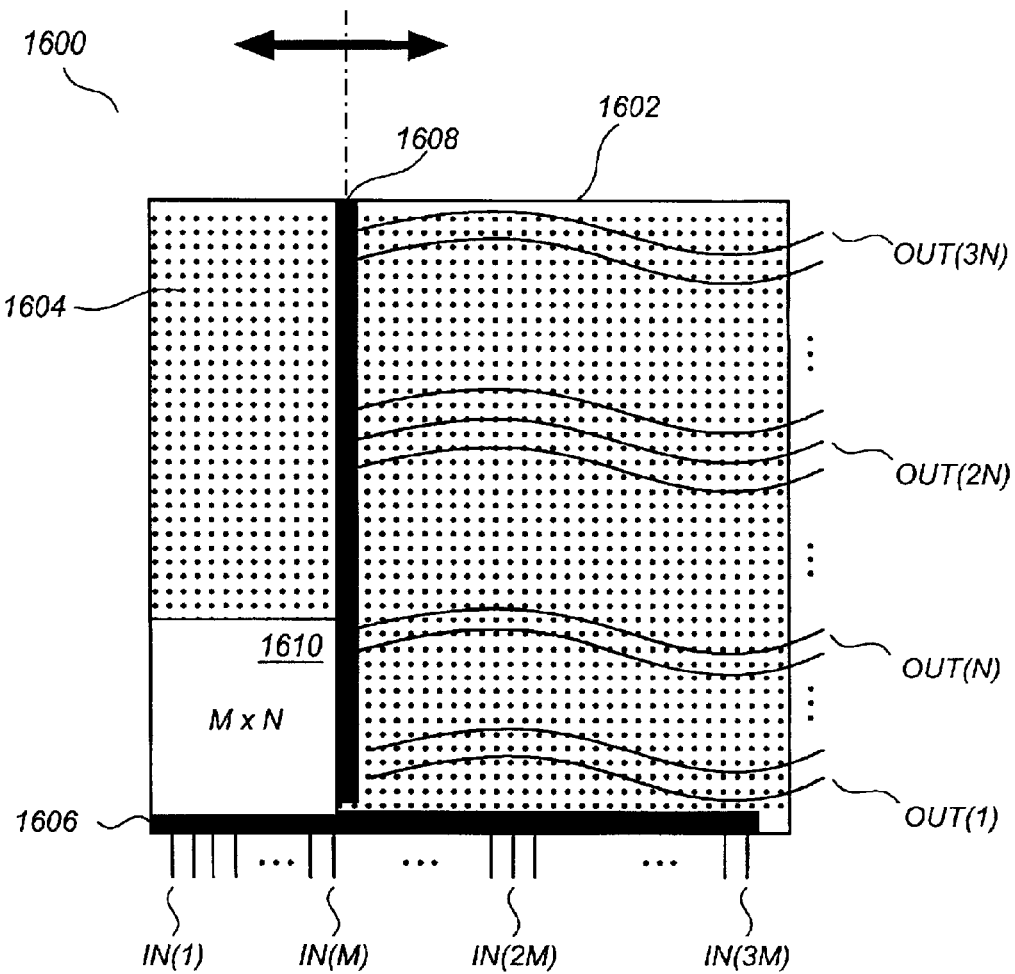
FIGS. 16–17 illustrate a modular, expandable optical cross-connect system in accordance with a preferred embodiment.
Figure 17:
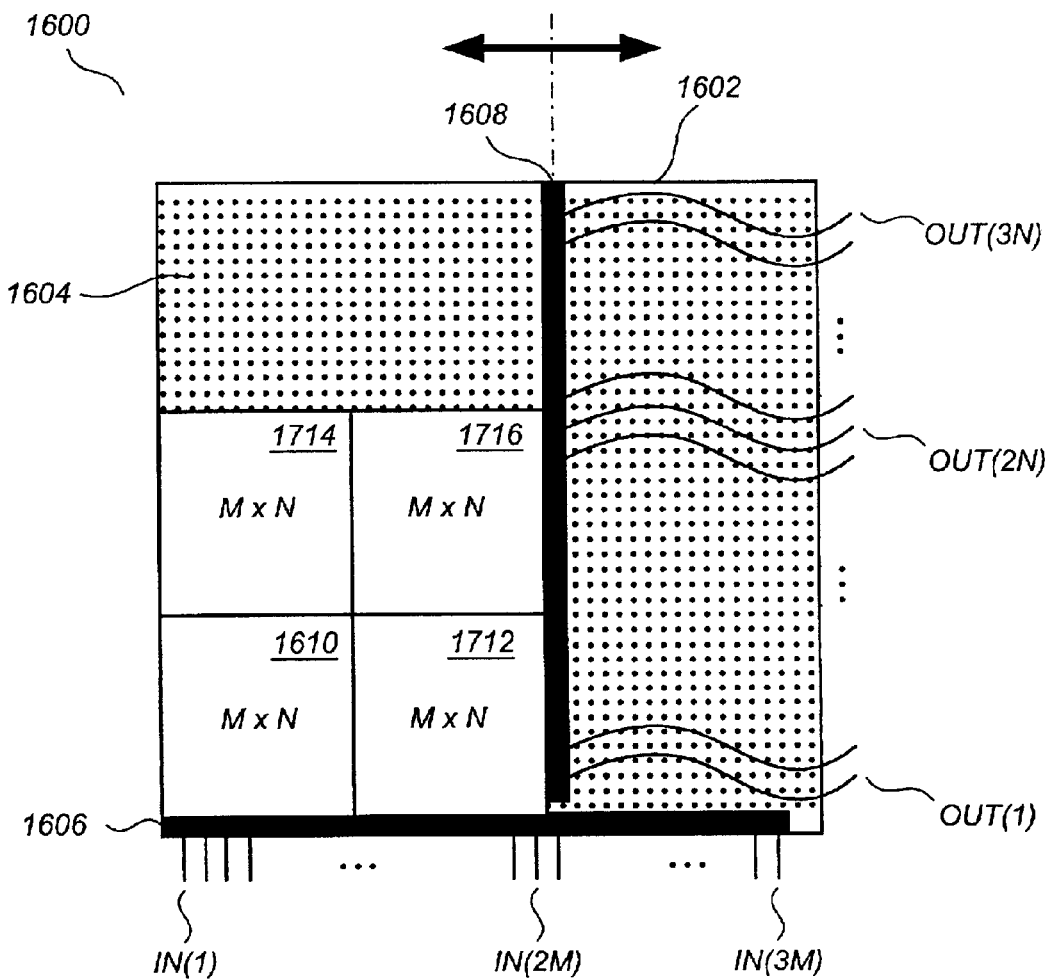

FIGS. 16 and 17 illustrate conceptual diagrams of a modular optical cross-connect system 1600 in accordance with a preferred embodiment. For clarity of disclosure, only a 3×3 system is illustrated (i.e., a system expandable from M×N to 3M×3N), although the number module slots may be substantially larger. FIG. 16 shows the optical cross-connect system 1600 in which only a single cross-connect module is inserted to create an M×N optical cross-connect. FIG. 17 shows the optical cross-connect system 1600 in which four (4) cross-connect modules are inserted to create a 2M×2N optical cross-connect.

With reference to FIG. 16, optical cross-connect system 1600 comprises a backplane 1602 comprising a large array 1604 of electrical surface contacts, an input coupling array 1606, and an output optical coupling array 1608. A single optical cross-connect module 1610 is provided having an internal switching fabric similar to the integrated optical cross-connect embodiments described supra. However, optical cross-connect module 1610 comprises input waveguides that run all the way from an input edge (bottom edge in FIG. 16) to the opposite end (top edge in FIG. 16), with the input waveguide cross-sections appearing at both ends. Preferably, the edge surfaces are extremely flat (e.g., surface variations less than 0.4 μm). The edge surfaces are adapted and configured such that if a second cross-connect module is placed directly above a first cross-connect module and precisely aligned therewith (e.g. causing any gap therebetween to be not greater than 0.8 μm at any point along the border), an optical signal traveling along an input waveguide in the first cross-connect module will exit that waveguide, traverse the gap, enter into a corresponding input waveguide in the second cross-connect module, and continue propagating in the second cross-connect module. It has been found that when the gap between the cross-connect modules is sufficiently small (e.g., less than 0.8 μm), any losses due to beam spreading in the gap, and/or reflections back into the first cross-connect module, are tolerable.

Similar to its input waveguides, the optical cross-connect module 1610 further comprises output waveguides that run all the way from the output edge (right edge in FIG. 16) to the opposite edge (left edge in FIG. 16), these edges also being extremely flat. These edges are also configured and dimensioned such that, if a third cross-connect module is placed directly adjacent to the output edge of the first cross-connect module (the right edge in FIG. 16), an optical signal traveling along an output waveguide in the first cross-connect module will exit that waveguide, traverse the gap, enter into a corresponding output waveguide in the third cross-connect module, and continue propagating in the third cross-connect module. Because all four edges of the cross-connect module 1610 are involved in light transfer in and out of the chip, the electrical contacts of the cross-connect module 1610 are placed on its bottom, whereby surface-mounting contact with the electrical surface contacts 1604 may be achieved.

Input coupling array 1606 comprises optical elements (e.g., waveguide elements, micro-lenses, etc.) known in the art, and is configured to be capable of receiving up to "3M" optical signals from optical fibers, planar optical devices, or other input devices and providing those light signals to the respective inputs of the mounted cross-connect modules. Output coupling array 1608 is likewise configured to be capable of receiving optical signals from the output edges of the cross-connect modules and providing those signals to external optical devices. Additionally, as illustrated in FIGS. 16–17, output coupling array 1608 is designed to be slidable in the direction of the output waveguides (i.e., the horizontal direction in FIGS. 16 and 17) to mechanically accommodate additional optical cross-connect modules as they are added.

FIG. 17 shows the optical cross-connect system 1600 of FIG. 16, with additional cross-connect modules 1712, 1714, and 1716 placed on the backplane 1602 to form a 2M×2M switching array. Advantageously, the cross-connect modules 1712, 1714, and 1716 may each be identical to the initial cross-connect module 1610. Thus, by providing a single backplane apparatus and one or more integrated optical cross-connects in accordance with the preferred embodiments, an expandable and modular optical switching architecture is achieved.

In an alternative preferred embodiment, the output coupling array 1608 may be fixably attached to the backplane 1602 instead of being slidable. In this preferred embodiment, a plurality of "dummy" extension chips are provided, comprising simple straight waveguide arrays corresponding to the output waveguides of the switching modules. In the event that fewer than the maximum number of cross-connect chips are used, the extension chips are inserted between the output edges of the cross-connect modules and the output coupling array 1608.

Advantageously, the preferred embodiments described supra may be adapted for use in a one-to-many "broadcast" type mode. For this mode, the cross-connect elements within each cross-connect module are made tunable, such that only a portion of the signal energy in the input waveguide is extracted onto the output waveguide at a given cross-connect. This allows the remaining signal energy to be distributed among one or more additional output waveguides. Likewise, a many-to-one switching fabric may also be readily realized by the preferred embodiments described supra.

In another preferred embodiment, each cross-connect module is equipped with beam size converters or lenses similar to the coupling arrays 1608 and 1610. Consequently, each cross-connect module is ready to receive and output collimated and spatially extending beams. This beam conversion may significantly relax the alignment precision and geometric precision when integrating many modules onto a big backplane.

According to an additional preferred embodiment, with particular application to the modular cross-connect system of FIGS. 16–17 in which signal loss may be problematic, a self-amplified integrated cross-connect module is provided. The self-amplified integrated cross-connect module is similar to the cross-connect modules described supra except that the input waveguides, output waveguides, and/or the arc connector portions of the waveguide bridging elements are doped with erbium or other amplifying element. Optical pumping signals may be introduced into each waveguide sufficient to create an amplifying effect as the optical signals pass through. According to one preferred embodiment, only a single optical pumping input needs to be provided for an entire cross-connect module, with the internal geometry being arranged such that the pumping light is reflected and/or scattered around the inside of the cross-connect module to bathe all waveguide elements in the pumping light. This may be achieved at least in part by providing mirrored surfaces along the top and bottom layers of the cross-connect module, such that the pumping light is reflected throughout a cavity formed by the mirrors.

Whereas many alterations and modifications of the present invention will no doubt become apparent to a person of ordinary skill in the art after having read the foregoing description, it is to be understood that the particular embodiments illustrated and described by way of illustration are in no way intended to be considered limiting. By way of example, it is to be appreciated that a person skilled in the art would be readily able to adapt the methods and structures of the preferred embodiments to optical cross-connects in which the incoming control signals are optical in form, rather than electronic in form. This may be achieved, for example, by using material that changes shape or size responsive to optical signals in lieu of the electrostatically-driven elements, or alternatively by providing an optical-to-electrical converter having an output that drives the electrostatic control plates. Therefore, reference to the details of the preferred embodiments are not intended to limit their scope, which is limited only by the scope of the claims set forth below.

What is claimed is:

1. An optical switch, comprising:
   a first waveguide formed in a first layer of an integrated circuit, the first waveguide having an input for receiving a light beam, and an output;
   a second waveguide formed in a second layer of the integrated circuit, the second waveguide being nonintersecting with said first waveguide and having an output; and
   a bridge waveguide twistably movable between a first position and a second position around an axis substantially parallel to said first and second layers, said bridge waveguide in said first position forming an index-guided, substantially nonreflecting optical pathway between said first and second waveguides such that said light beam exits said second waveguide, said bridge waveguide in said first position having an input end moved toward said first waveguide and an output end moved toward said second waveguide to establish said pathway, said bridge waveguide in said second position not providing said pathway so that said light beam exits said first waveguide.

2. The optical switch of claim 1, said bridge waveguide being formed in a third layer of the integrated circuit.

3. The optical switch of claim 2, wherein said third layer is positioned between said first and second layers.

4. The optical switch of claim 3, said first and second waveguides being nonparallel, said first waveguide passing over said second waveguide at a first angle around a common vertical axis, said input end being substantially parallel to said first waveguide and separated therefrom by a first gap when said bridge waveguide is in said second position, said output end being substantially parallel to said second waveguide and separated therefrom by a second gap when said bridge waveguide is in said second position, said input end of said bridge element being urged across said first gap toward said first waveguide when said bridge waveguide is in said first position such that a first optical contact therewith is achieved, said output end of said bridge element being urged across said second gap toward said second waveguide when said bridge waveguide is in said second position such that a second optical contact therewith is achieved, said bridge waveguide bending the light beam by said first angle while guiding it between said input end and said output end.

5. The optical switch of claim 4, said input end of said bridge element physically contacting said first waveguide when said bridge waveguide is in said first position.

6. The optical switch of claim 4, said input end of said bridge waveguide remaining physically separate from said first waveguide when said bridge waveguide is in said first position, but being positioned sufficiently close thereto such that a resonant optical coupling is formed therewith.

7. The optical switch of claim 4, wherein said first angle is less than 90 degrees.

8. The optical switch of claim 7, wherein said first angle is less than 60 degrees.

9. The optical switch of claim 8, said bridge waveguide being arcuate in shape and having a radius of curvature at all locations therealong greater than a bending loss threshold.

10. The optical switch of claim 4, said bridge waveguide comprising an electrostatically active material, said input and output ends being urged toward said first and second waveguides, respectively, by electrostatic forces.

11. The optical switch of claim 4, said bridge waveguide comprising an arcuate tongue-like structure, said input end and output end being on opposite sides of said tongue-like structure, said tongue-like structure being substantially surrounded by motion-permitting gaps and being connected to a remainder of the third material layer by a flexible, narrow neck that permits vertical movement of said input and output ends.

12. The optical switch of claim 4, wherein said bridge waveguide is piezoelectrically, magnetostrictively, or photorestrictively actuated.

13. An optical cross-connect device formed in an integrated circuit, comprising:
   a plurality of input waveguides formed in a first layer of the integrated circuit;
   a plurality of output waveguides formed in a second layer of the integrated circuit, said first and second layers being separated by at least one intermediate layer, each output waveguide passing underneath each input waveguide at a distinct cross-connect location; and
   at each cross-connect location, a micromechanically actuated bridge element formed in said at least one intermediate layer for optically coupling its associated input waveguide to its associated output waveguide responsive to an electrical control signal, said bridge element establishing an index-guided optical path between the input waveguide and the output waveguide when in an ON position, said bridge element not establishing said optical path when in an OFF position, said bridge element in said ON position having an input end being moved toward said input waveguide and an output end being moved toward said output waveguide according to a twistable actuation thereof to establish said optical path.

14. The optical cross-connect of claim 13, said input waveguides being substantially parallel to each other, said output waveguides being substantially parallel to each other and oriented at a first angle with respect to said input waveguides, each of said bridge elements comprising an arcuate index-guiding waveguide between said input end and said output end that incrementally bends the light beam by said first angle as it guides the light beam from said input end to said output end.

15. The optical cross-connect of claim 14, wherein said first angle is less than 90 degrees, and wherein said arcuate waveguide has a radius of curvature greater than a bending loss threshold at all points therealong.

16. The optical cross-connect of claim 15, wherein said first angle is less than 60 degrees.

17. The optical cross-connect of claim 14, wherein said input end of said bridge element is moved toward said input waveguide until mechanical contact therewith is established for achieving said optical coupling.

18. The optical cross-connect of claim 14, wherein said input end of said bridge element is moved toward said input waveguide by an amount that does not establish mechanical contact but that brings said input end into close enough proximity with said input waveguide to establish a resonant coupling therewith.

19. The optical cross-connect of claim 14, wherein said bridge element is piezoelectrically, magnetostrictively, or photorestrictively actuated.

20. The optical cross-connect of claim 14, wherein said bridge element is electrostatically actuated.

21. An optical cross-connect device formed in an integrated circuit, comprising:
   a plurality of input waveguides formed in a first layer of the integrated circuit;
   a plurality of output waveguides formed in a second layer of the integrated circuit, said first and second layers being separated by at least one intermediate layer, each output waveguide passing underneath each input waveguide at a distinct cross-connect location; and
   at each cross-connect location, a micromechanically actuated bridge element formed in said at least one intermediate layer for optically coupling its associated input waveguide to its associated output waveguide responsive to an electrical control signal, said bridge element establishing an index-guided optical path between the input waveguide and the output waveguide when in an ON position, said bridge element not establishing said optical path when in an OFF position, said input waveguides being substantially parallel to each other, said output waveguides being substantially parallel to each other and oriented at a first angle with respect to said input waveguides, each of said bridge elements comprising an input end that optically couples to the associated input waveguide for receiving a light beam traveling therein, an output end that optically couples to the associated output waveguide for transferring said light beam thereto, and an arcuate index-guiding waveguide that incrementally bends the light beam by said first angle as it guides the light beam from said input end to said output end, said bridge element being substantially surrounded by gaps in said at least one layer of the integrated circuit such that vertical motion of the input and output ends thereof are permitted, said arcuate index-guiding waveguide being connected to a remainder of said at least one layer by a neck portion that permits twisting of the arcuate index-guiding waveguide around an axis substantially parallel to said first and second layers such that said input end rises toward said first layer when said output end lowers toward said second layer.

22. An expandable, modular optical cross-connect system, comprising:
   at least one M×N integrated optical cross-connect module, M>1, N>1, each cross-connect module comprising:
      a top surface, a bottom surface, a first side opposite a second side, and a third side opposite a fourth side;
      a plurality M of input waveguides extending from said first side to said second side, said first and second sides being mateably shaped to each other such that two such cross-connect modules placed side-by-side in a direction of said input waveguides achieve flush optical communication with each other, light beams exiting input waveguides on the second side of one cross-connect module entering corresponding input waveguides on the first side of the other cross-connect module;

a plurality N of output waveguides extending from said third side to said fourth side, said third and fourth sides being mateably shaped to each other such that two such cross-connect modules placed side-by-side in a direction of said output waveguides achieve flush optical communication with each other, light beams exiting output waveguides on the fourth side of one cross-connect module entering corresponding output waveguides on the third side of the other cross-connect module;

a plurality MN of controllable cross-connecting elements that optically couple any of said M input waveguides to any of said N output waveguides responsive to at least one externally provided electrical control signal; and at least one electrical contact located on said bottom surface for receiving said at least one externally provided electrical control signal; and a jM×kN optical switching backplane capable of holding a j×k array of said cross-connect modules, j>1, k≧1, comprising:

an array surface having a j×k array of electrical contacts positioned to establish electrical communication with said electrical contacts of said cross-connect modules when placed on said array surface;

an input connector comprising j adjacent sets of M optical input elements, each set being mateably shaped to achieve flush optical communication with said first side of said cross-connect module; and an output connector comprising k adjacent sets of N optical output elements, each set being mateably shaped to achieve flush optical communication with said fourth side of said cross-connect module;

whereby said optical cross-connect system is expandable from an M×N device when a single cross-connect module is inserted into said optical switching backplane to an aM×bM device when provided with (ab−1) additional cross-connect modules, 1<a≦j, 1≦b≦k.

23. The expandable, modular optical cross-connect system of claim 22, each of said cross-connect modules having exactly four sides.

24. The expandable, modular optical cross-connect system of claim 23, each of said four sides being flat and having surface variations of no more than 0.4 $\mu$m in areas corresponding to said input and output waveguides, whereby an air gap of no more than 0.8 $\mu$m exists between any two respective input waveguides or any two respective output waveguides for any two adjacent cross-connect modules.

25. The expandable, modular optical cross-connect system of claim 24, said input waveguides of each cross-connect module being formed in a first material layer thereof, said output waveguides of each cross-connect module being formed in a second layer thereof, each controllable cross-connecting element comprising a micromechanically actuated bridge waveguide establishing an index-guided optical path between one of the input waveguides and one of the output waveguides when in an ON position.

26. The expandable, modular optical cross-connect system of claim 25, wherein said bridge waveguide is piezoelectrically, magnetostrictively, or photorestrictively actuated responsive to said externally provided electrical control signals.

27. The expandable, modular optical cross-connect system of claim 24, wherein said bridge waveguide is electrostatically actuated responsive to said externally provided electrical control signals.

* * * * *